(12) United States Patent
Rahman (10) Patent No.: US 6,442,614 B1
(45) Date of Patent: Aug. 27, 2002

(54) METHOD AND APPARATUS FOR LOST CONNECTIVITY RECOVERY

(75) Inventor: Moshiur Rahman, Freehold, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/470,418

(22) Filed: Dec. 22, 1999

(51) Int. Cl.$^7$ ............................................. G06F 15/173
(52) U.S. Cl. ...................... 709/239; 709/228; 370/227; 714/4
(58) Field of Search ................................ 709/239, 249, 709/228, 227, 223, 224, 221, 219, 217; 714/4, 2, 8, 25, 48; 370/216–221, 225–228, 292–295; 375/222; 348/9–12, 21

(56) References Cited

U.S. PATENT DOCUMENTS

| | | | | |
|---|---|---|---|---|
| 3,794,923 A | * | 2/1974 | Ellis ............................ | 370/478 |
| 4,862,268 A | * | 8/1989 | Campbell et al. ............ | 348/463 |
| 5,323,144 A | * | 6/1994 | Imai et al. .................... | 340/2.7 |
| 5,835,125 A | * | 11/1998 | Bhagavath ................... | 725/127 |
| 6,052,554 A | * | 4/2000 | Hendricks et al. ........... | 725/109 |
| 6,301,223 B1 | * | 10/2001 | Hrastar et al. ............... | 370/227 |
| 6,378,131 B2 | * | 4/2002 | Cunningham et al. ....... | 725/119 |
| 6,397,388 B1 | * | 5/2002 | Allen .......................... | 348/734 |

* cited by examiner

Primary Examiner—Mehmet B. Geckil (57) ABSTRACT

A method and apparatus that carry out communication between a customer premises equipment and a target network service through any of a number of head ends. When a connectivity between the customer premises equipment and the target network through a first head end is lost, a call is initiated to a server using an Internet protocol network. A second, alternate, head end is selected based on the customer premises equipment, the first head end, the target network, the network service, the day and the hour. Subsequently, the customer premises equipment is coupled through the second head end to the target network.

19 Claims, 6 Drawing Sheets

METHOD AND APPARATUS FOR LOST CONNECTIVITY RECOVERY

BACKGROUND OF THE INVENTION

1. Field of Invention

This invention relates to communication apparatuses and methods. More particularly, this invention relates to connectivity recovery in a communication network.

2. Description of Related Art

When a cable TV (CATV) head end that interfaces with customer premises equipment (CPE) over a hybrid fiber coaxial (HFC) network loses connectivity with a public switched telephone network (PSTN), the Internet, or any other information or communication network, there is no known technique for recovering the lost connectivity.

SUMMARY OF THE INVENTION

Therefore, there is a need for apparatuses and methods for recovering a lost connectivity so that the down time and operation cost experienced because of the lost connectivity can be minimized.

According to exemplary embodiments of this invention, when CPE determines that a connection between a head end and a communication network is lost, the CPE initiates a connection to a database to determine an alternative route and then initiates a connection to another head end that is coupled to the communication network.

According to other exemplary embodiments of this invention, when a head end determines that a connection with a communication network is lost, the head end initiates a connection to a database to determine an alternative route and then initiates a connection to another head end that is coupled to the communication network.

These and other features and advantages of this invention are described in or are apparent from the following detailed description of the methods and apparatuses designed according to this invention.

BRIEF DESCRIPTION OF THE DRAWINGS

The operation of the present invention will be readily appreciated and understood from consideration of the following detailed description of exemplary embodiments of this invention, when taken together with the accompanying drawings, in which.

DETAILED DESCRIPTION OF PREFERRED EMBODIMENTS

Figure 1:
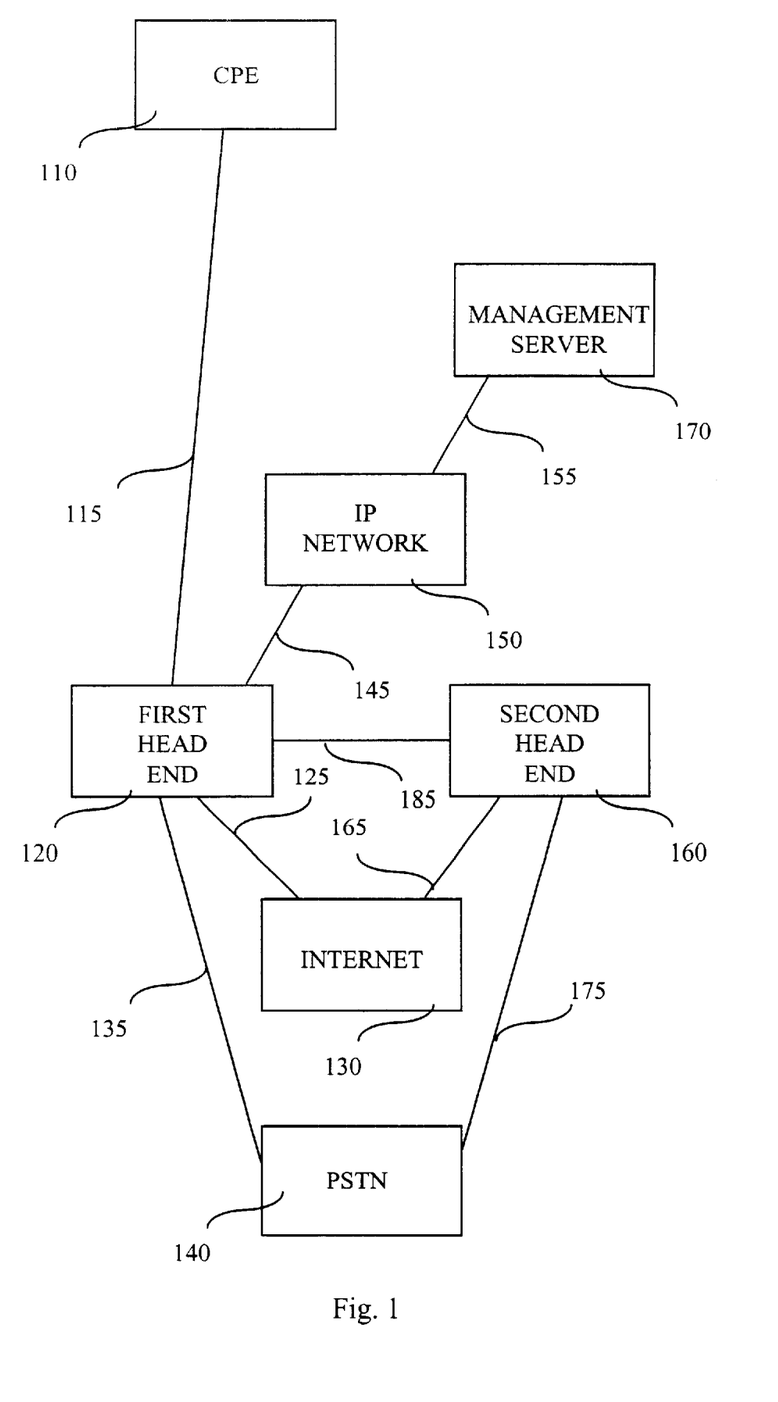
FIG. 1 is a schematic representation of one type of connectivity failure experienced by communication networks used in conjunction with the connection recovery method and apparatus according to an exemplary embodiment of the invention.

FIG. 1 is a schematic representation of communication networks used in connection recovery methods and apparatuses according to an exemplary embodiment of this invention. In FIG. 1, CPE 110 is coupled to a first head end 120 through a hybrid fiber coaxial line 115. The head end 120 is coupled to the Internet 130 through a communication link 125, to the public switched telephone network 140 through a communication link 135, to a second head end 160 through a link 185 and to an Internet protocol (IP) network 150 through a communication link 145.

A management server 170 is connected to the IP network 150 through a link 155. The second head end 160 is coupled to the Internet 130, through a communication link 165 and to the PSTN 140 through a communication link 175.

The CPE 110 may be, for example, an electronic apparatus that a user can use to gain access to various communication networks, such as television networks, the Internet or public telephone networks. The CPE 110 may, for example, be a settop box. The first head end 120 includes termination equipment, for example, a multiplexer and a demultiplexer, not shown. The first head end 120 aggregates data traffic, e.g., video, data, voice, address information, etc. downstream from the head end 120 to the CPE 110. Additionally, the CPE 110 aggregates data traffic upstream from the CPE 110 to the head end 120 for processing by the head end 120 or routing to the PSTN 140 or the Internet 130.

When the CPE 110 tries to gain access to a communication network, such as, for example, the PSTN 140 or the Internet 130, through the first head end 120, access may be denied because the connectivity between the first head end 120 and the communication network is lost.

A first exemplary embodiment of the invention initiates connectivity recovery when a connection is lost between the CPE 110 and the head end 120. Such a situation causes a loss in connectivity between the CPE 110 and a targeted network, e.g., Internet 130 or PSTN 150. When the CPE 110 determines that there is a failure in its connectivity to a targeted network, e.g., Internet 130 or PSTN 140, the CPE 110 initiates a call over the first head end 120 and the IP network 150 to establish connectivity with the management server 170. The CPE 110 then identifies a second head end 160 having a viable connection with the target network based on the information stored in the management server 170.

A second exemplary embodiment of the invention initiates connectivity recovery when the head end 120 determines that there is a failure in its connectivity to a targeted network, e.g., Internet 130 or PSTN 140, the head end 120 initiates a call over the IP network 150 to establish connectivity with the management server 170. The head end 120 then identifies a second head end 160 having a viable connection with the target network based on information stored in the management server 170.

In accordance with each of these embodiments, the lost connectivity between the target network and CPE 110 is re-established. The management server 170 receives the call from either the CPE 110 or the head end 120 and selects a second head end 160 from among all available second head ends in the network. The selection is performed based on the identity of the CPE 110, established by a protocol address and based on the communication network to which the CPE 110 is attempting to be coupled. For example, the management server 170 includes a database that comprises, for each couple of CPE 110 and communication network, e.g., Internet 130 or PSTN 140, that can be coupled together, a prioritized list of best second head ends 160.

Once a second head end 160 is selected, the CPE 110 establishes connectivity with the selected second head end 160 so that the connection between the CPE 110 and the communication network is established through the selected second head end 160.

In FIG. 1, the communication links 115, 125, 135, 145, 155, 165, 175 and 185 can be any known or later developed device or system for connection, including a direct cable connection, a connection over a wide area network or a local area network, a connection over an intranet, a connection over the Internet, a connection over a fiber optic network or a connection over any other distributed network or system. Further, it should be appreciated that the communication links 115, 125, 135, 145, 155, 165, 175 and 185 can each be a wired or a wireless communication link to a network.

Figure 2:
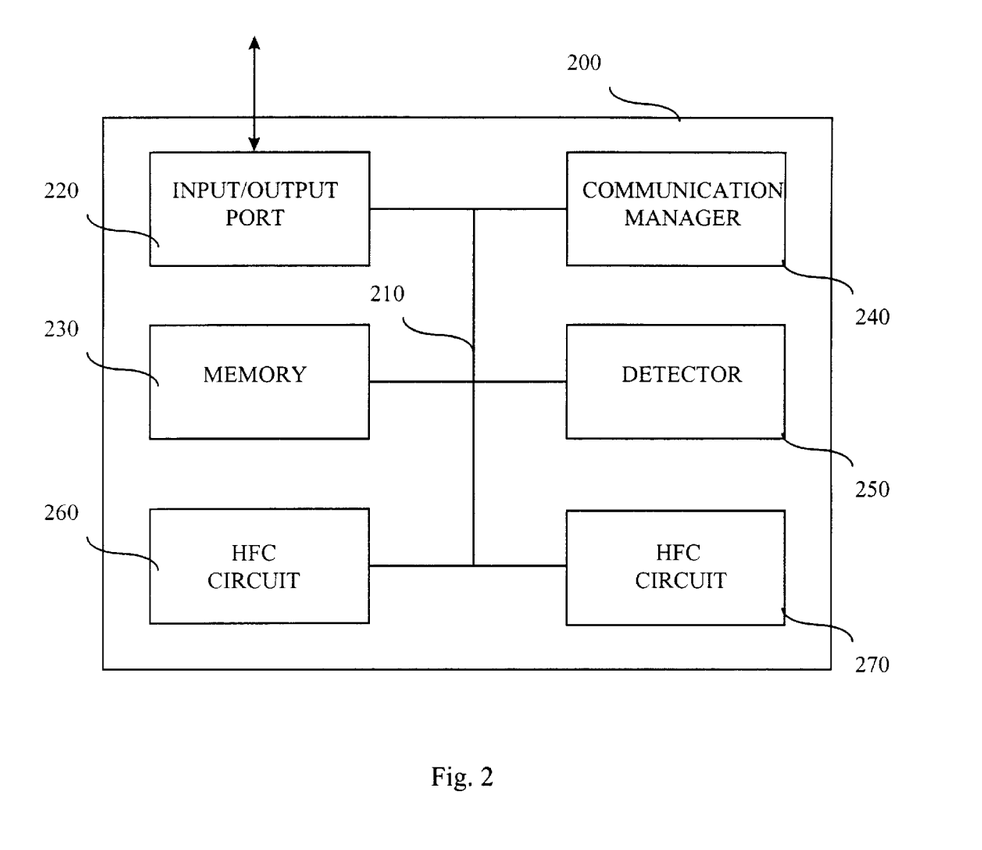
FIG. 2 is a schematic functional diagram of a connection recovery apparatus according to the exemplary embodiment of this invention.

FIG. 2 is a schematic functional diagram of a connection recovery apparatus 200 used in the communication network shown in FIG. 1. This connection recovery apparatus 200 can be embedded in the CPE 110, as in the first exemplary embodiment, or the head end 120, as in the second exemplary embodiment.

As shown in FIG. 2, the connection recovery apparatus 200 includes an input/output port 220, a memory 230, a communication manager 240, a detector 250, an HFC circuit 260 and an IP network interface circuit 270. Components 220–270 are coupled together by a control/data bus 210. The input/output port 220 is coupled to at least a HFC communication link and a wireless communication link (not shown). When the connection recovery apparatus 200 is embedded in the head end 120, the input/output port 220 is also coupled through at least one communication link to at least one communication network, such as the PSTN 140 or the Internet 130, shown in FIG. 1. The input/output port 220 may be coupled to any number of the total number of communication networks to which the head end is coupled.

The memory 230 particularly stores a program run by the communication manager 240 and/or the detector 250 and data and addresses used by the communication manager 240 and/or the detector 250. The communication manager 240 and/or the detector 250 may be, in the exemplary embodiment of the connection recovery apparatus 200, a microprocessor that runs a program to implement exemplary embodiments of the methods and apparatuses according to this invention.

However, each of the communication manager 240 and the detector 250 can also be implemented on a special purpose computer, a programmed microcontroller and peripheral integrated circuit elements, an ASIC or other integrated circuit, a digital signal processor, a hardwire electronic or logic circuit such as a discrete element circuit, a programmable logic device such as a PLD, PLA, FPGA or PAL, or the like. In general, any device capable of implementing a finite state machine that is in turn capable of implementing the flowcharts shown in FIGS. 3 and 4 can be used to implement the communication manager 240 and/or the detector 250.

The HFC circuit 260 provides an interface between the HFC communication link and the communication manager 240. The IP network interface circuit 270 provides an interface between the IP network 150, shown in FIG. 1, and the communication manager 240.

In operation, upon request of a user of a CPE 110, shown in FIG. 1, the communication manager 240 tries to establish a connection between the CPE 110 and a target network, such as a PSTN 140 or the Internet 130 through the head end 120. The detector 250 detects whether the connection is established, and, if so, continuously monitors the connection to determine if the connection has been lost. For example, the detector 250 monitors the signals received from the target network to which the CPE is coupled, and when no signal is received during a predetermined period, a connectivity failure is detected.

The detector 250 informs the communication manager 240 when the detector 250 detects that the connection is not established or that the connection is lost after having been properly established. In such circumstances, the communication manager 240 sends a message to the management server 170 identifying at least one identifier of the CPE 110, the first head end 120, the target network to which the CPE 110 tries to be coupled or the network service to which the CPE 110 tries to be coupled, via the first head end 120 and the IP network 150.

The management server 170 then returns an address of a second head end 160 to the communication manager 240. The communication manager 240 then initiates a connection with the second head end 160. When a connection is established with the second head end 160, the communication manager 240 sends call completion information, including an identifier of the communication network to which the CPE 110 tries to be coupled, to the second head end 160.

Thus, the connection between the CPE 110 and the target network to which the CPE 110 tries to be coupled can be completed using the second head end 160. If this connection request using the second head end 160 fails, the process of calling the management server 170, selecting a new head end and establishing a connection to the target network through the new selected head end can be repeated with as many head ends as are available in the network as many times as is necessary to establish a connection with the target network.

Figure 3:
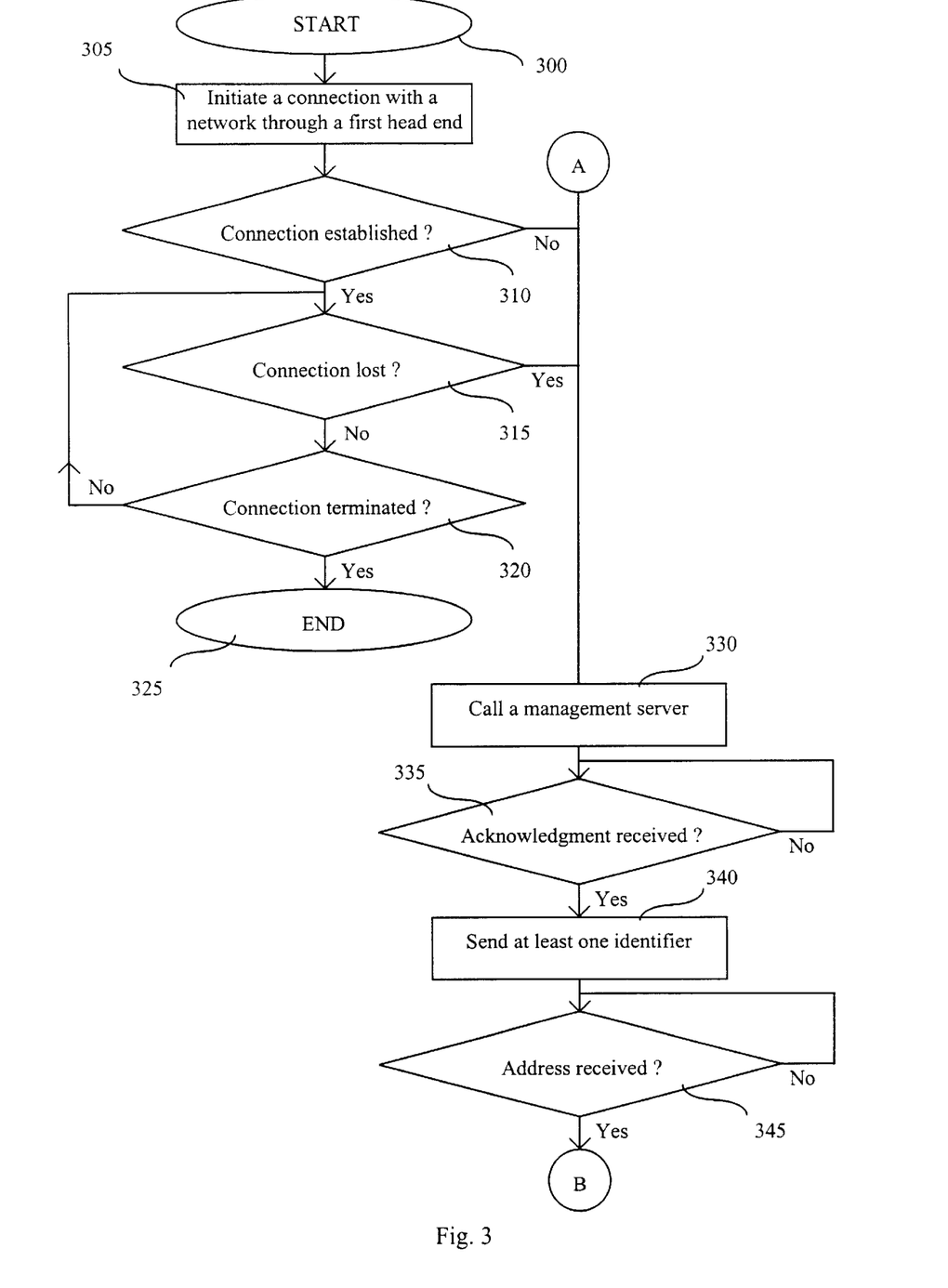
FIGS. 3 and 4 are flowcharts illustrating a connection recovery method according to an exemplary embodiment of this invention.
Figure 4:
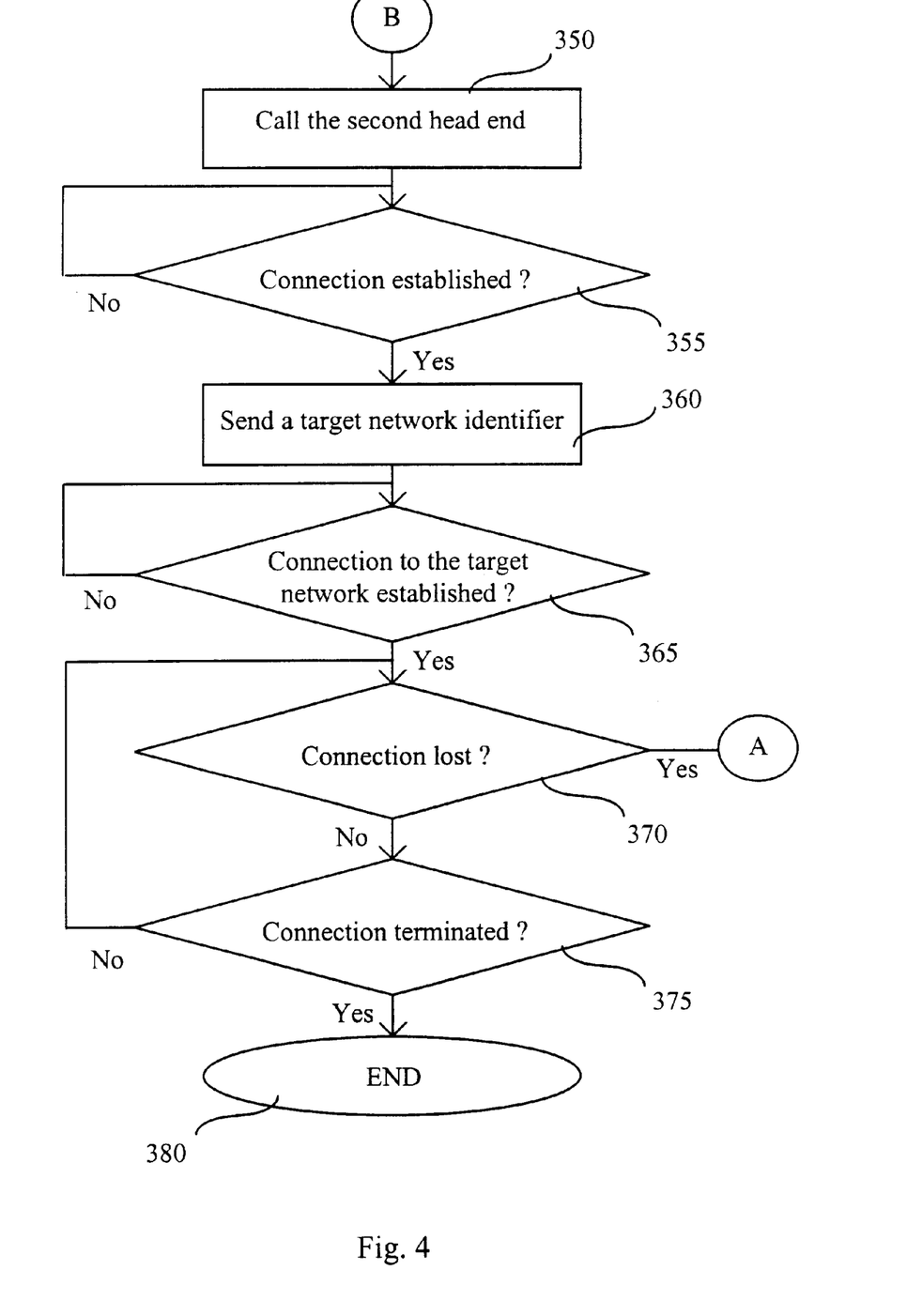

FIGS. 3 and 4 are flowcharts illustrating a connection recovering method according to an exemplary embodiment of this invention. The method begins in step 300 and control proceeds to step 305. In step 305, a connection is initiated between CPE and a target network. Control then continues to step 310. In step 310, it is determined whether the initiated connection is established. If so, control continues to step 315. Otherwise, control jumps to step 330. In step 315, monitoring of the connection is performed and it is determined whether the connection is lost. If so, control jumps to step 330. Otherwise, control continues to step 320 where control determines if the connection has been voluntarily terminated by a user. If so, control continues to step 325 where the process ends. Otherwise, control returns to step 315.

In step 330, when it has been established that the connection has been lost, a call is initiated to a management server and control proceeds to step 335. In step 335, it is determined whether the connection with the management server is established by determining if an acknowledgment message is received from the management server. If so, control continues to step 340. Otherwise, control returns to step 335. In step 340, control sends to the management server an identifier of at least one of the CPE requesting access to a target network, the first head end previously handling access to the target network by the CPE and the target network or the target network service. Control then proceeds to step 345.

In step 345, it is determined whether an address of a second head end has been received from the management server. If so, control continues to step 350 (as shown in FIG. 4). Otherwise, control returns to step 345. As shown in FIG. 4, in step 350, a call is initiated to the second head end whose address has been received from the management server and control proceeds to step 355. As shown in FIG. 4, in step 355, it is determined whether the connection with the second head end is established. If so, control continues to step 360. Otherwise, control returns to step 355. In step 360, control sends to the second head end an identifier of the target network. Control then proceeds to step 365.

In step 365, control determines whether the initiated connection is established. If so, control continues to step 370. Otherwise control returns to step 365. In step 370, it is again determined whether a connection between the CPE and the target network has been lost. If so, control returns to step 330 (as shown in FIG. 3) to initiate the selection of another alternative head end and establishment of a connection to the target network using that alternative head end. Otherwise, control continues to step 375 in which it is determined if the connection has been voluntarily terminated by a CPE user, i.e., the customer. If so, control continues to step 380 where the process ends. Otherwise, control returns to step 370 to perform connection monitoring.

Figure 5:
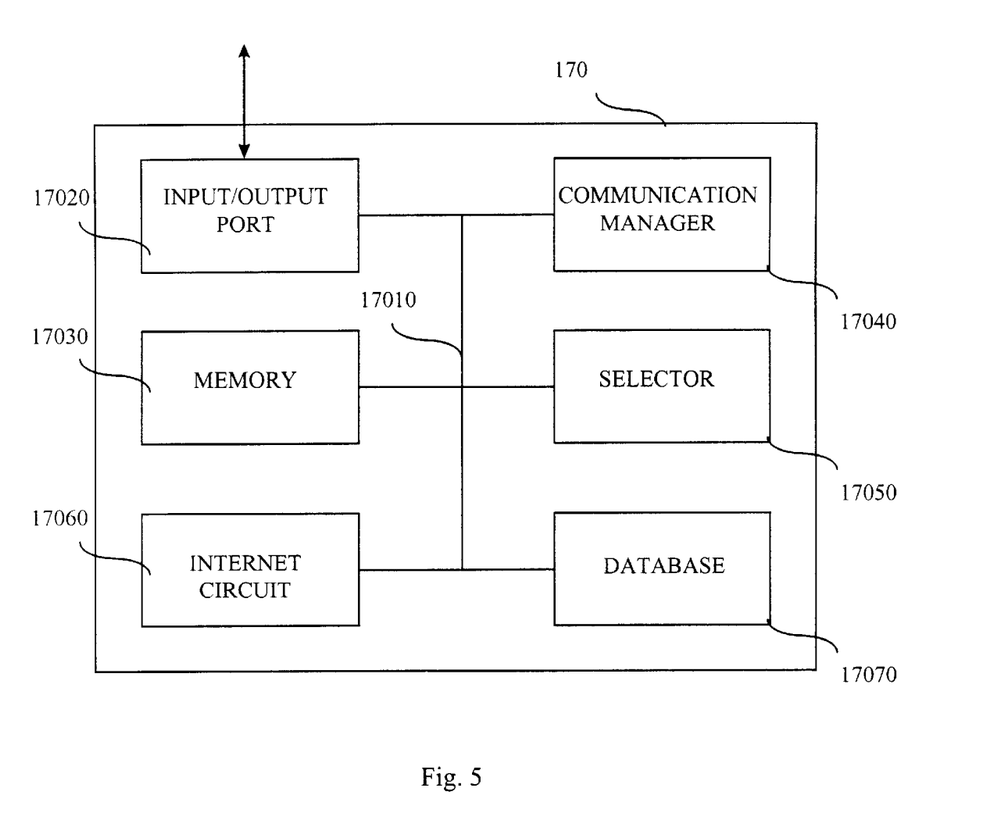
FIG. 5 is a schematic functional diagram of a management server according to an exemplary embodiment of this invention.

FIG. 5 is a schematic functional diagram of a management server 170 according to an exemplary embodiment of this invention. This management server 170 includes an input/output port 17020, a memory 17030, a communication manager 17040, a selector 17050, an Internet interface circuit 17060 and a database 17070. Components 17020–17070 are coupled together by a control/data bus 17010.

The memory 17030 particularly stores a program run by the communication manager 17040 and/or the selector 17050 and data and addresses used by the communication manager 17040 and/or the selector 17050. The communication manager 17040 and/or the selector 17050 may be realized in a microprocessor that runs a program to implement exemplary embodiments of the invention. However, each of the communication manager 17040 and the selector 17050 can also be realized in a special purpose computer, a programmed microcontroller and peripheral integrated circuit elements, an ASIC or other integrated circuit, a digital signal processor, a hardwire electronic or logic circuit such as a discrete element circuit, a programmable logic device such as a PLD, PLA, FPGA or PAL, or the like. In general, any device capable of implementing a finite state machine that is in turn capable of implementing the flowchart shown in FIG. 6 can be used to implement the communication manager 17040 and/or the selector 17050.

The database 17070 stores a table of second head ends in correspondence with at least one of an identifier of a CPE, a first head end identifier, a target network, a network service, a day, an hour. The Internet interface circuit 17060 provides protocol and data format information to allow the communication manager 17040 to interface with the Internet.

In operation, when the management server 170 receives a call from a connection recovery apparatus 200 such as that shown in FIG. 2, the communication manager 17040 sends an acknowledgment message to the calling connection recovery apparatus 200 so that a connection is established between the connection recovery apparatus 200 and the management server 170.

Subsequently, the communication manager 17040 waits for a message including at least one of a CPE identifier, a first head end identifier, a target network identifier and a network service identifier. Upon reception of such a message, the selector 17050 accesses the database 17070. The selector 17050 then selects a second, alternate, head end based on at least one of the identifier of the CPE, the identifier of the first head end, the identifier of the target network, the network service, the day and the hour. The selected, alternate, second head end is different from the first head end and is capable of being coupled to both the CPE and the target network.

The management server 170 then returns to the connection recovery apparatus 200 an address of the second head end 160 and establishes the connection with the connection recovery apparatus 200.

Alternatively, the management server 170 connects the connection recovery apparatus 200 to the selected, alternate, second head end 160 and forwards to the second head end 160 an identifier of the target network.

Figure 6:
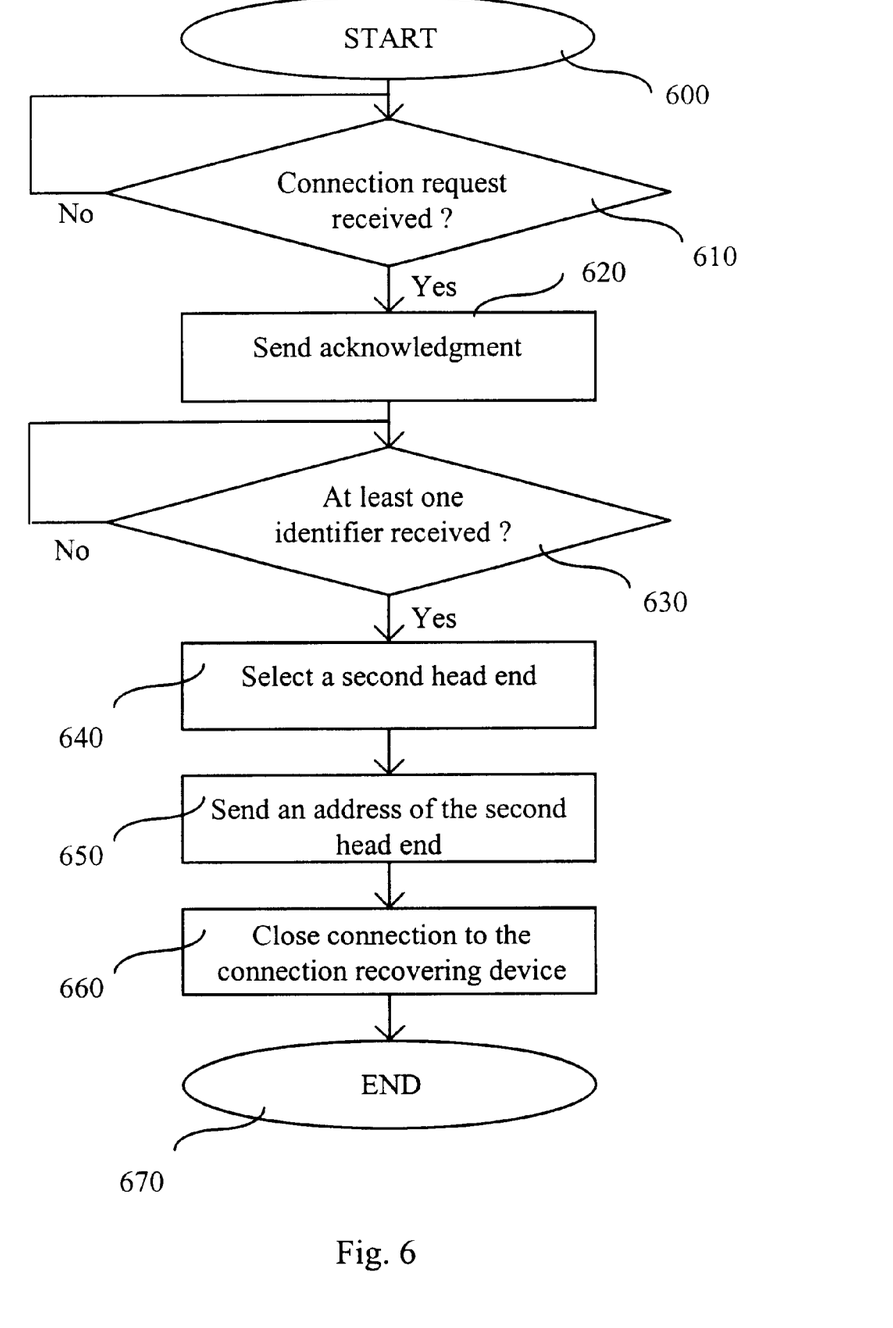
FIG. 6 is a flowchart illustrating operation of a management server during a connection recovery method according to an exemplary embodiment of this invention.

FIG. 6 is a flowchart illustrating operation of a management server used in a connection recovery operation method according to an exemplary embodiment of this invention. The method begins in step 600 and control proceeds to step 610. In step 610, it is determined whether a communication request is received. If so, control continues to step 620. Otherwise, control returns to step 610. In step 620, control sends an acknowledgment message to the sender of the communication request and control proceeds to step 630. In step 630, it is determined whether a message identifying at least one of a CPE, a first head end and a target network is received. If so, control continues to step 640. Otherwise, control returns to step 630. In step 640, a second, alternate, head end is selected from a list of head ends in the database, based on at least one of a CPE identifier, a first head end identifier, a target network identifier, the network service, the day and the hour and control proceeds to step 650. The selected second head end is different from the first head end and is capable of being coupled to both the CPE and the target network.

In step 650, a message to the connection recovery apparatus is sent including an address of the second, alternate, head end. Control then continues to step 660 in which the connection with the connection recovery apparatus is terminated. Control then proceeds to step 670 where the operation method ends.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for implementing communication between customer premises equipment and a target network including a target network service through an alternate head end, the method comprising:

detecting when a connectivity between the customer premises equipment and the target network through a first head end is lost;

initiating a call over an Internet protocol network when a lost connectivity is detected; and initiating communication between the customer premises equipment and the target network service through the alternate head end.

2. The method of claim 1, wherein the call over the Internet protocol network transmits at least one of an identifier of the customer premises equipment, an identifier of the first head end, an identifier of the target network or an identifier of the target network service.

3. The method of claim 2, further comprising selecting an alternate head end based on at least one of the identifier of the customer premises equipment, the identifier of the first head end, the identifier of the target network service and the identifier of the target network service.

4. The method of claim 1, wherein the call over the Internet protocol network transmits an address of the alternate head end.

5. The method of claim 4, wherein the communication through the alternate head end comprises transmitting an identifier of the target network to the alternate head end.

6. The method of claim 1, further comprising:
   receiving, over an Internet protocol network, at least one of an identifier of the customer premises equipment, an identifier of the first head end, an identifier of the target network and an identifier of the target network service; and
   selecting the alternate head end based on at least one of the identifier of the customer premises equipment, the identifier of the first head end, the identifier of the target network service and the identifier of the network service.

7. The method of claim 6, further comprising transmitting an address of the alternate head end over the Internet protocol network.

8. The method of claim 6, further comprising sending an identifier of the target network to the alternate head end.

9. An apparatus for implementing communication between a customer premises equipment and a target network including a target network service through an alternate head end, the apparatus comprising:
   a detector that detects when a connectivity between the customer premises equipment and the target network through a first head end is lost;
   an Internet protocol network link; and
   a communication manager that initiates a call over the Internet protocol network link when the detector detects that the connectivity is lost,
   wherein the communication manager receives an address of the alternate head end and initiates communication through the alternate head end.

10. The apparatus of claim 9, wherein the communication manager receives an address of the alternate head end.

11. The apparatus of claim 10, wherein the communication manager sends an identifier of the target network to the alternate head end.

12. The apparatus of claim 9, wherein the communication manager sends at least one of an identifier of the customer premises equipment, an identifier of the head end, an identifier of the target network and an identifier of the target network service.

13. The apparatus of claim 12, wherein the call over the Internet protocol link is directed to a server.

14. The apparatus of claim 13, wherein the server selects the alternate head end based on the at least one of the identifier of the customer premises equipment, the identifier of the head end, the identifier of the target network and the identifier of the target network service.

15. The apparatus of claim 13, wherein the management server connects the communication manager to the alternate head end.

16. The apparatus of claim 13, wherein the management server sends an address of the alternate head end to the communication manager.

17. Customer premises equipment that includes the apparatus of claim 9.

18. A head end that includes the apparatus of claim 9.

19. A server that includes the apparatus of claim 9.

* * * * *